United States Patent [19]

Rionda et al.

[11] Patent Number: 4,555,887
[45] Date of Patent: Dec. 3, 1985

[54] TRUSS ASSEMBLY AND CONNECTOR FOR USE WITH TRUSSES

[75] Inventors: Carlos S. Rionda; Joaquin J. Palacio, both of Miami, Fla.

[73] Assignee: Gang-Nail Systems, Inc., Miami, Fla.

[21] Appl. No.: 456,340

[22] Filed: Jan. 7, 1983

Related U.S. Application Data

[63] Continuation-in-part of Ser. No. 424,216, Sep. 27, 1982, and a continuation-in-part of Ser. No. 423,169, Sep. 24, 1982, Pat. No. 4,455,805.

[51] Int. Cl.$^4$ .............................................. F16B 5/00
[52] U.S. Cl. .................................. 52/712; 52/DIG. 6; 52/289; 403/232.1; 403/405.1
[58] Field of Search ................... 52/DIG. 6, 693, 289, 52/712, 650, 702; 411/461–464, 466–468; 403/232.1, 405, 283

[56] References Cited

U.S. PATENT DOCUMENTS

| | | | |
|---|---|---|---|
| 666,918 | 1/1901 | Butz | 403/232.1 |
| 2,911,690 | 11/1959 | Sanford | 403/232.1 |
| 3,365,222 | 1/1968 | Polyak | 52/712 |
| 3,961,455 | 6/1976 | Peters | 52/693 |
| 3,989,398 | 11/1976 | Wendt | 403/232.1 |
| 4,297,048 | 10/1981 | Jureit | 411/466 |

FOREIGN PATENT DOCUMENTS 468708  7/1972  Canada .................................. 52/702

Primary Examiner—John E. Murtagh
Assistant Examiner—Kathryn Ford
Attorney, Agent, or Firm—LeBlanc, Nolan, Shur & Nies

[57] ABSTRACT

A truss assembly of floor or roof trusses and connector hangers are disclosed for attaching respective ends of a truss to a beam extending transversely to the longitudinal axis of the truss. The hanger includes a connecting plate having a plurality of teeth struck out from the plate so as to extend perpendicular from the connecting plate with the strap and the connecting plate being mutually perpendicular. The strap has a plurality of apertures adapted for receiving nails or like fasteners and extends the entire length of the outside edge of the connecting plate to which the strap is joined and projects past the connecting plate to provide a surface for securing the strap to the wooden beam. The strap is rectangular in shape and bent to a generally U shape so as to define three sections. The first section extends along and past the outside edge of the connecting plate to which it is attached, and this section is connected to the first side of the wooden beam by fasteners extending through the apertures into the wood. The second and third sections can be connected respectively to the top and side of the wooden beam by fasteners extending through the apertures therein. The truss assembly is preferably attached to the wooden beam by "left" and "right" hangers of "mirror image" configuration which have their respective connecting plates attached to opposed sides of the truss in proximity to its end and offset vertically with respect to the top of the beam; the respective sections of the straps are attached to the sides and top of the beam in a parallel configuration.

4 Claims, 5 Drawing Figures

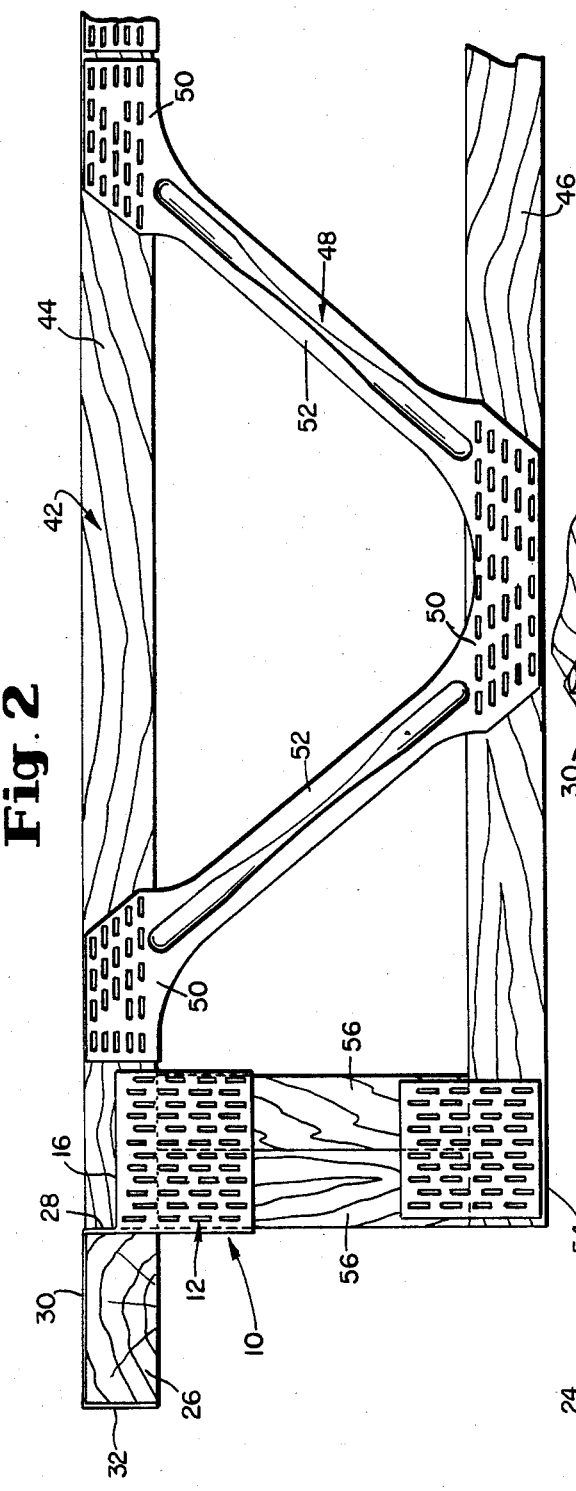
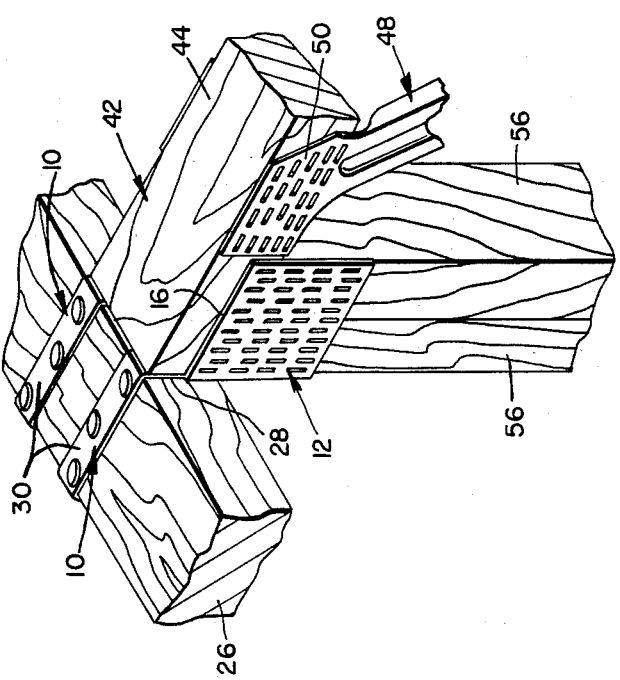
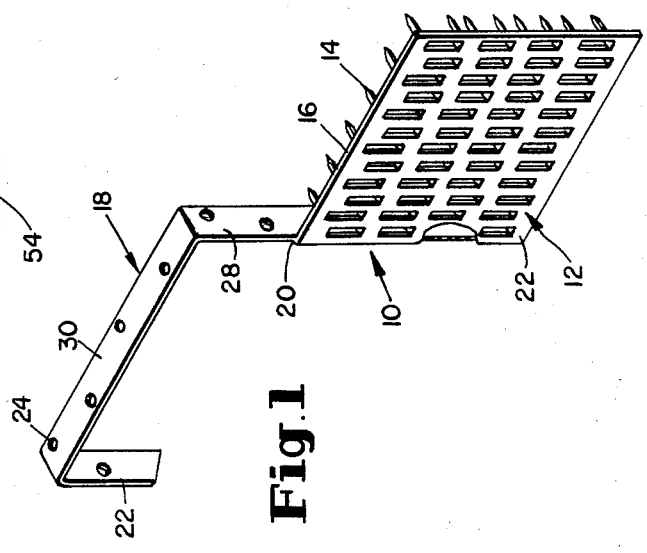
Fig. 1
Fig. 2
Fig. 3

TRUSS ASSEMBLY AND CONNECTOR FOR USE WITH TRUSSES

CROSS REFERENCE TO RELATED APPLICATIONS

This application is a continuation-in-part of U.S. patent application Ser. No. 424,216, filed Sept. 27, 1982 which is entitled TRUSS ASSEMBLY AND TRUSS HANGER AND CONNECTOR HANGER FOR USE WITH TRUSSES, and U.S. patent application Ser. No. 423,169, U.S. Pat. No. 4,455,805 filed Sept. 24, 1982 which is entitled TRUSS ASSEMBLY AND TRUSS HANGER FOR USE WITH TRUSSES, and which are assigned to the same assignee as the present invention.

BACKGROUND OF THE INVENTION

The present invention relates to floor and roof wooden truss assemblies and to hardware for attaching trusses to transverse beams.

DESCRIPTION OF PRIOR ART

In constructing various types of wooden truss assemblies, including both roof trusses and floor trusses, it has been common to use large wooden structural members such as 2"×10"'s. Such large wooden members, however, are becoming increasingly difficult to obtain and have increased in cost substantially. Consequently, various alternatives have been sought for enabling the construction of trusses which are able to bear the structural loads of full dimension lumber but are constructed using lumber of small dimensions such as 2"×4" members which are spaced apart and interconnected by metal connectors.

Substitutes for full dimension lumber roof trusses and floor trusses must satisfy three primary criteria. First, the trusses must be able to withstand large compressive loads so that they may be used for bearing substantial loads. Second, it is desirable that the trusses be prefabricated at a manufacturing plant at a low labor cost and shipped to a building site without a high degree of risk of incurring damage to the trusses. Third, the trusses must be capable of being easily assembled into the building at the job site without extensive labor.

Various types of hardware have been developed for making prefabricated trusses. U.S. Pat. No. 4,078,352 to Knowles and U.S. patent application Ser. No. 337,671 to Robert Gottlieb entitled TRUSS STRUCTURES CONSTRUCTED WITH METAL WEB MEMBERS filed on Jan. 7, 1982, which is assigned to the assignee of the present invention, disclose hardware for making prefabricated floor trusses. U.S. Pat. Nos. 3,025,577 and 3,298,151, both to Jureit, disclose hardware for use in making prefabricated roof trusses.

Trusses have been installed at the building site in a number of ways. If the trusses are being used to construct a floor, they are positioned on top of the foundation walls and nailed into a beam which extends transversely to the longitudinal axis of the trusses. The trusses normally are nailed in place by toenailing through the wood at the end of the truss. Roof trusses have been attached to transverse beams by procedures similar to those used for attaching floor trusses to transverse beams.

SUMMARY OF THE INVENTION

It is an object of the invention to provide floor and roof truss assemblies having trusses attached to beams running transversely to the longitudinal axis of the trusses which enables a simplified procedure for attaching the trusses to the beams.

It is a further object of the invention to provide floor and roof truss assemblies having trusses securely joined to beams running transversely to the longitudinal axis of the truss without the use of extensive labor at the job site.

It is yet a further object of the present invention to provide a connector hanger for use in attaching floor and roof trusses to transverse beams which have connecting plates which are offset vertically from the top of the transverse beams.

The connector hanger of the invention provides a mechanism for attaching trusses fixedly to a beam running transversely to the longitudinal axis of individual trusses which eliminates the need for using toenailing procedures which require the extensive use of fasteners. Normally, a pair of "left" and "right" hangers is attached to both ends of each truss which hangers each have a bracket which may be positioned over the top of the beam and easily fastened to the beam without the use of extensive labor. The top of the bracket is vertically offset with respect to a connector plate to facilitate the attachment of trusses, such as roof trusses, which have ends that are attached below the top of the transverse beam.

A connector hanger used for making a truss assembly in accordance with the invention includes: a connecting plate disposed in a first plane and having a plurality of teeth struck out from the plate and extending generally perpendicular from the connecting plate; and a strap joined to one of the outside edges of the connecting plate and disposed in a second plane, the second plane being substantially perpendicular to the first plane, the strap extending the entire length of the edge of the connecting plate to which the strap is joined and projecting past the connecting plate to provide a surface for connecting the strap to a wooden member. The strap is bent so as to be generally U-shaped, and thereby has three sections.

Each of the sections of the strap is preferably perpendicular to the adjacent section. Thus a first 90° angle is formed by the intersection of the first and second sections and a second 90° angle is formed by the intersection of the second and third sections. The first section of the strap extends along and past the outside edge of the connecting plate to which it is attached. The extension of the first section past the outside edge of the connecting plate permits the vertical offsetting of the connecting plate with respect to the transverse beam to which the strap is to be connected. The first section is connected to the beam by fasteners extending through apertures in this section of the strap. The second section of each strap is connected to the top of the wooden beam by fasteners extending through apertures in this section of the strap. The third section of each strap is connected to a second side of the wooden beam by fasteners extending through apertures in this section of the strap into the wood. The first and third sections of the strap are parallel to each other when attached to a wooden beam.

The truss assembly of the present invention has "left" and "right" connector hangers of the aforementioned type which have their respective connecting plates attached to opposed sides of the truss in proximity to the end of the truss. The "left" and "right" hangers are mirror images of each other. The respective sections of the strap of the left and right hand hangers are attached to the sides and the top of the beam in a parallel configuration.

Either floor or roof truss assemblies may be made in accordance with the invention.

BRIEF DESCRIPTION OF THE DRAWINGS

FIG. 1 is a perspective view of a connector hanger in accordance with the invention.

FIG. 2 is a side elevation of a floor truss assembly in accordance with the invention.

FIG. 3 is a perspective view of a portion of a floor truss assembly in accordance with the invention.

DESCRIPTION OF THE PREFERRED EMBODIMENTS

Figure 4:
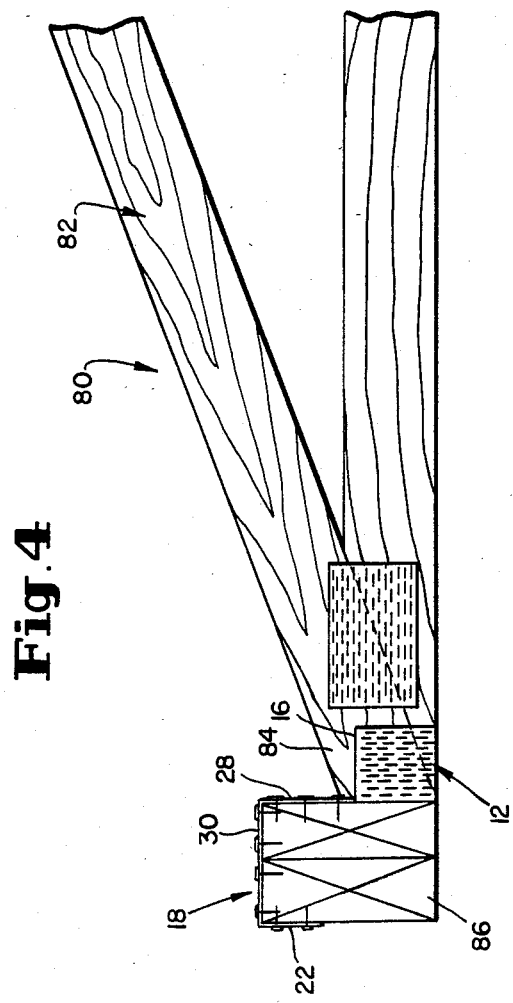
FIG. 4 is a side elevational view of a roof truss assembly in accordance with the invention.

A connector hanger 10 as shown in FIG. 1, includes a connector plate 12 and a strap 18. The connecting plate 12 has a plurality of sharp teeth-like projections 14 which are struck from the connector plate 12 and which extend generally perpendicular from a first plane containing the connecting plate 12. The connecting plate 12 is preferably rectilinear in shape and has four outside edges 16. The strap 18 is joined to one of the outside edges 16. The strap 18 extends from the first end 22 of the outside edge 16 to which it is attached completely along the outside edge past the other end 20 of the outside edge 16.

The strap 18 has a first section 28 which extends the entire length of the side 16 of the connecting plate 12 to which the strap is attached and up past the end 20. The distance which the first section 28 extends past end 22 is variable depending upon the amount of vertical offset required between the second section 30 and the top edge 16 of the connecting plate. The first section 28 and the second section 30 form a 90° angle. The second section 30 and the third section 32 form a 90° angle. The first section 28 is adapted to be connected to a first side of a transverse beam; the second section 30 is adapted to be connected to the top of the transverse beam and third section 32 is adapted to be connected to a second side of the transverse beam which is parallel to the first side. Apertures 24 are used for receiving nails which are driven into the transverse beam to secure the strap 18 to the support beam.

Alternatively, instead of providing apertures in the strap, a plurality of grasshopper type teeth can be stricken from the strap. Once the connecting hanger is attached to the truss and the strap is arranged over the support beam, the grasshopper teeth are driven into the support beam.

FIGS. 2 and 3, respectively, illustrate an end elevational view and an isometric view of a floor truss assembly in accordance with the invention which preferably uses a pair of "left" and "right" hand connector hangers 10 as illustrated in FIG. 1 to secure the floor truss 42 to the transverse beam 26. The "left" and "right" hangers 10 are the mirror image of each other and differ in the direction that the teeth-like projections 14 project from the connecting plate 12. The truss 42 has an upper wooden member 44 and a lower wooden member 46 which may be made from standard dimension lumber such as a 2"×4" which is turned on its side so that the width of each 2"×4" within the truss is parallel to the horizontal. The upper wooden member 44 and the lower wooden member 46 are fixedly attached to a plurality of metal web members 48 which may be of any known construction but which preferably are those which are described in the aforementioned U.S. patent application Ser. No. 337,671.

Each of the metal web members 48 has three connecting plates 50 which have a plurality of sharp teeth-like projections which are pressed into the wooden members 44 and 46 to completely embed the projections into the wood to securely attach the metal web member into the upper and lower wooden members. While the design of the sharp teeth-like projections is not part of the present invention, preferably they are manufactured in accordance with the teachings of U.S. Pat. No. 4,343,580 which is owned by the assignee of the present invention. A pair of intermediate sections 52 connect the connecting plate 50 at the vertex with the connecting plates at the ends.

Each truss 42 is supported at its ends 54 by a pair of truss end supporting beams 56 which run transverse to the longitudinal axis of the truss. While a particular design of the floor truss 42 has been illustrated, any type of wooden floor truss may be used in the floor truss assembly. The length of the extension of the first section 28 of hanger 10 above the top edge 16 of the connecting plate determines the amount of vertical offset between the top section 30 and the top edge 16 of the connecting plate 12. Vertical offset between the top of the transverse beam 26 and the top edge of a floor truss 42 is useful where other connectors are attached to the top end of the truss or where if is desired to have the connecting plate 12 attached below the top of the truss.

Figure 5:
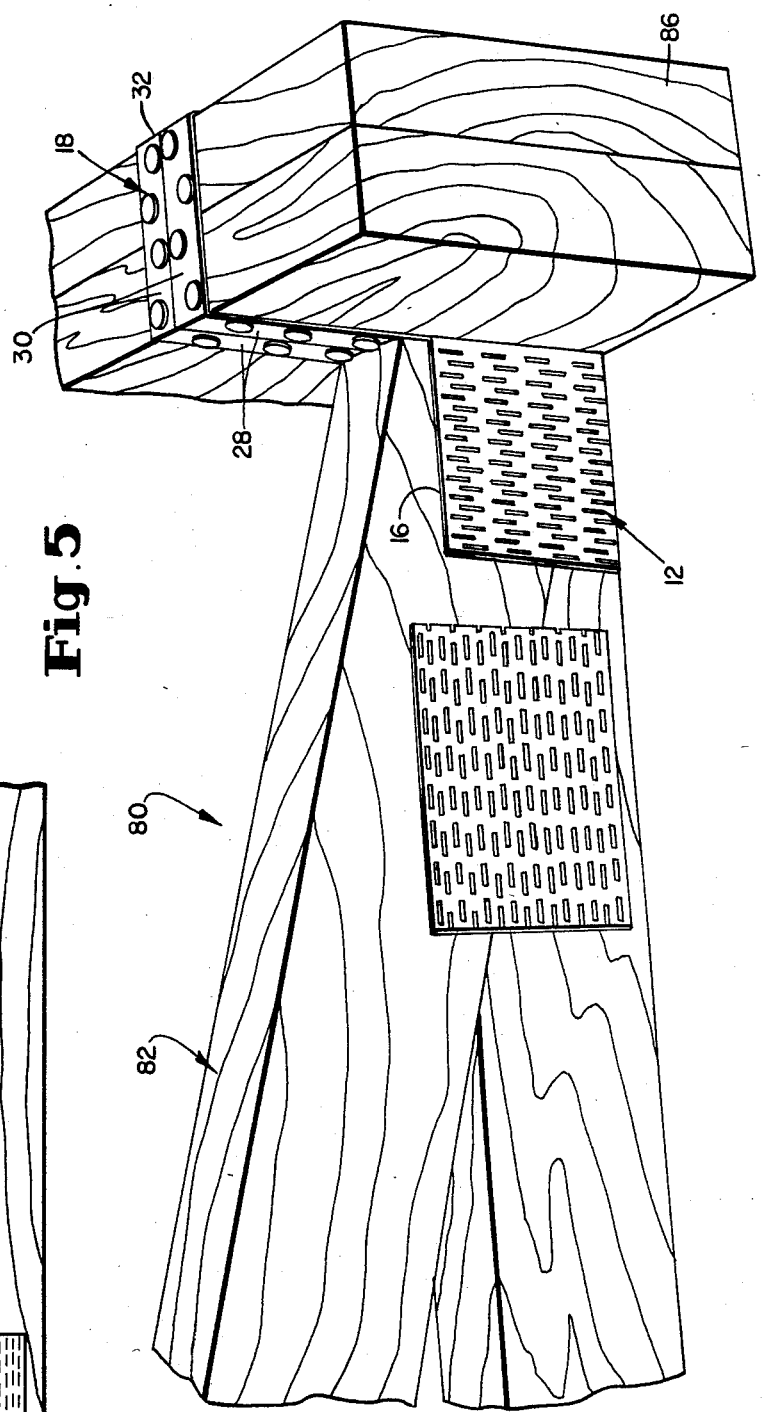
FIG. 5 is a perspective view of a portion of a roof truss assembly in accordance with the invention.

FIGS. 4 and 5, respectively, illustrate an end elevation view and an isometric view of a roof truss assembly 80 in accordance with the invention which preferably uses a pair of "left" and "right" hand connector hangers 10 as illustrated in FIG. 1 to secure the roof truss 82 to the end of transverse beam 86. The "left" and "right" hangers 10 are the mirror images of each other and differ in the direction that the teeth-like projections 14 project from the connecting plate 12. While a particular roof truss assembly 80 has been illustrated, any type of roof truss 82 may be used which has wooden ends 84 into which the sharp teeth-like projections 14 of the connecting plate 12 may be pressed. The length of the extension of the first section 28 of the hanger 10 above the top edge 16 of the connecting plate determines the amount of vertical offset between the top section 30 and the top edge of the connecting plate 12. Vertical offset between the top of the transverse beam 86 and the top edge of a roof truss is often utilized in attaching the roof truss 82 to a transverse beam. This offset may be varied without departing from the invention and varies as a function of the width of the transverse beam 86 and the point of attachment of the connecting plate 12 to the end of the roof truss 82.

The use of pairs of "left" and "right" connector hangers 10 illustrated in FIGS. 3 and 5 to respectively attach a floor truss 42 and a roof truss 82 to a transverse beam produces rigid high strength truss assemblies which do not require extensive labor for assembly with the support beams at the construction site.

Preferably, each connector hanger has a strap length measured from end 22 which varies as a function of the width and thickness of the beam to which the strap 18 is attached as illustrated in FIGS. 3–5. In construction it is common to use beams which are made from two or more pieces of standard dimension lumber which are attached to each other with the width of the individual pieces in surface contact with each other. The following table represents the preferred length of the strap 18 as a function beam width and thickness when two or three plies of standard dimension lumber are used to form the transverse beam.

| INDIVIDUAL BOARD SIZE | LENGTH IN INCHES OF STRAP 18 MEASURED FROM END 20 | |
| --- | --- | --- |
| | 2 Plies | 3 Plies |
| 2" × 4" | 8 | 10 |
| 2" × 6" | 10 | 12 |
| 2" × 8" | 12 | 14 |
| 2" × 10" | 14 | 16 |
| 2" × 12" | 16 | 18 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A floor truss assembly comprising:
   (a) a floor truss structure extending in a first direction and having first and second sides;
   (b) a wooden beam having two sides, a top and a bottom, and extending in a direction transverse to said truss structure;
   (c) a pair of connector hangers fixedly connecting said truss structure to said wooden beam, each of said connector hangers including a connecting plate and a strap, and said pair of connector hangers being of like construction but of mirror image configuration;
   (d) each of said connecting plates having a plurality of sharp teeth-like projections extending generally orthogonally from said connecting plate, said connecting plates each having a plurality of outside edges;
   (e) each of said straps being joined to an outside edge of said connecting plate to form approximately a 90° angle with said connecting plate, each of said straps having a pair of elongated sides and extending the entire length of the edge of said connecting plate to which said strap is joined and projecting beyond said connecting plate to provide a surface for nailing or like fastening said strap to said wooden beam, each of said straps being joined to said associated connecting plate along one of the elongated sides, said teeth-like projections extending in a direction so as to overlie said strap;
   (f) each of said straps being bent into a generally U shape so as to have first, second and third sections, said first section extending along the length of the edge of said connecting plate to which the strap is attached and extending beyond said edge to provide a substantial portion of said first section which offsets the second section of the strap from the top of said connecting plate, said first section being connected to a first side of said wooden beam, said second section being connected to the top of said wooden beam and said third section being attached to a second side of the wooden beam, the first, second and third sections of the strap of one of said hangers being parallel to the corresponding first, second and third sections of the strap of the other hanger; and
   (g) the connecting plate of said first connector hanger being attached to a first side of the truss by embedment of the tooth-like projections within the first side of the truss in proximity to the end of the truss and said connecting plate of said second connector hanger being attached to a second side of the truss by embedment of the teeth-like projections within the second side of the truss in proximity to the end of the truss, with the connecting plates being opposed to each other, said connecting plates being positioned with respect to said truss so that the first sections of the straps are positioned between the truss and the beam.

2. A truss assembly in accordance with claim 1 wherein the U shape is defined by first and second approximate 90° angles, the first 90° angle being formed by the intersection of the first and second sections and the second 90° angle being formed by the intersection of the second and third sections.

3. A roof truss assembly comprising:
   (a) a roof truss structure extending in a first direction and having first and second sides;
   (b) a wooden beam having two sides, a top and a bottom, and extending in a direction transverse to said trusss structure;
   (c) a pair of connector hangers fixedly connecting said truss structure to said wooden beam, each of said connector hangers including a connecting plate and a strap, and each of said pair of connector hangers being of like construction but of mirror image configuration;
   (d) each of said connecting plates having a plurality of sharp teeth-like projections extending generally orthogonally from said connecting plate, said connecting plates each having a plurality of outside edges;
   (e) each of said straps being joined to an outside edge of said connecting plate to form approximately a 90° angle with said connecting plate, and each of said straps having a pair of elongated sides and extending the entire length of the edge of said connecting plate to which said strap is joined and projecting beyond said connecting plate to provide a surface for nailing or like fastening said strap to said wooden beam, each of said straps being joined to said associated connecting plate along one of the elongated sides, said teeth-like projections extending in a direction so as to overlie said strap;
   (f) each of said straps being bent into a generally U shape so as to have first, second and third sections, said first section extending along the length of the edge of said connecting plate to which the strap is attached and extending beyond said edge to provide a substantial portion of said first section which offsets the second section of the strap from the top of said connecting plate, said first section being connected to a first side of said wooden beam, said second section being connected to the top of said wooden beam and said third section being attached to a second side of the wooden beam, the first, second and third sections of the strap of one of said hangers being parallel to the corresponding first, second and third sections of the strap of the other hanger; and (g) the connecting plate of one said connector hanger being attached to a first side of the truss by embedment of the teeth-like projections within the first side of the truss in proximity to the end of the truss and said connecting plate of said other connector hanger being attached to a second side of the truss by embedment of the teeth-like projections within the second side of the truss in proximity to the end of the truss, with the connecting plates being opposed to each other, said connecting plates being positioned with respect to said truss so that the first sections of the straps are positioned between the truss and the beam.

4. A truss assembly in accordance with claim 3, wherein the U shape is defined by first and second approximate 90° angles, the first 90° angle being formed by the intersection of the first and second sections and the second 90° angle being formed by the intersection of the second and third sections.

* * * * *